Patented May 22, 1951

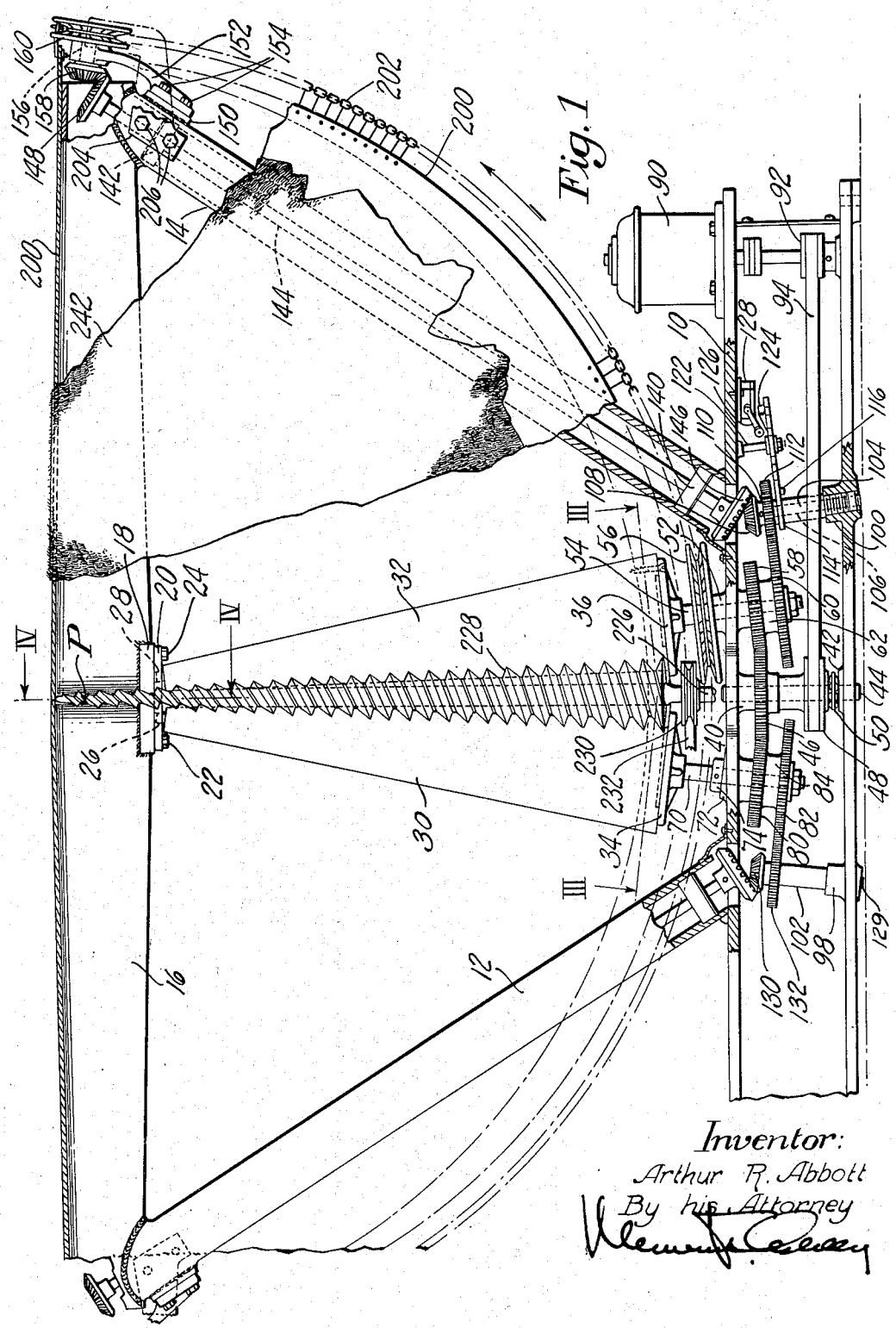

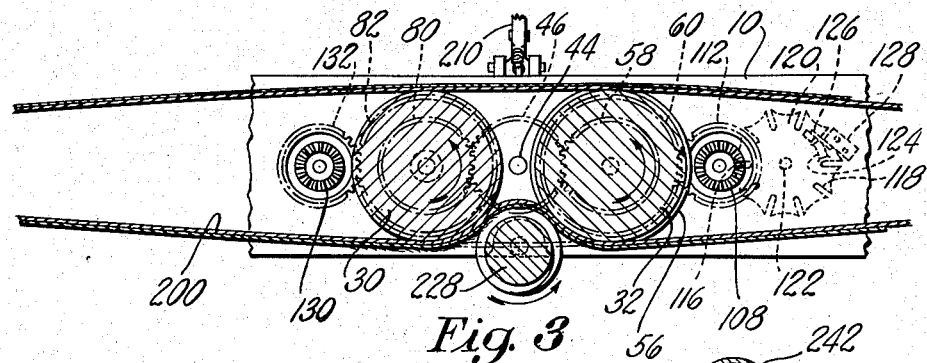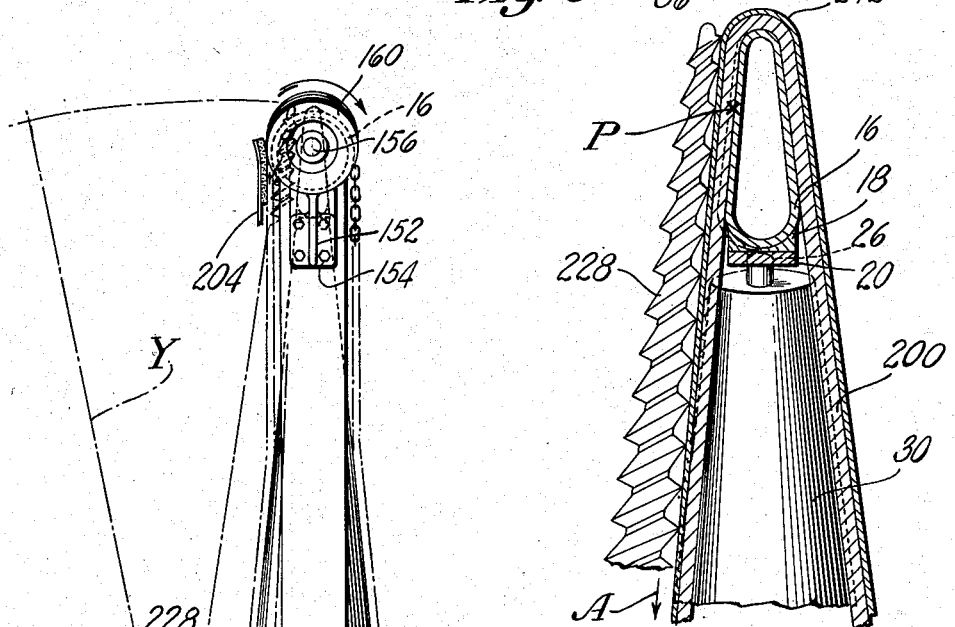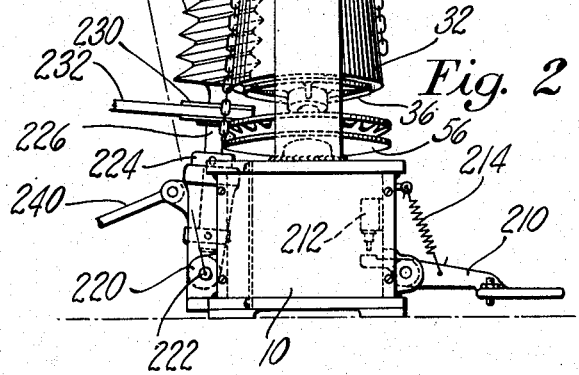

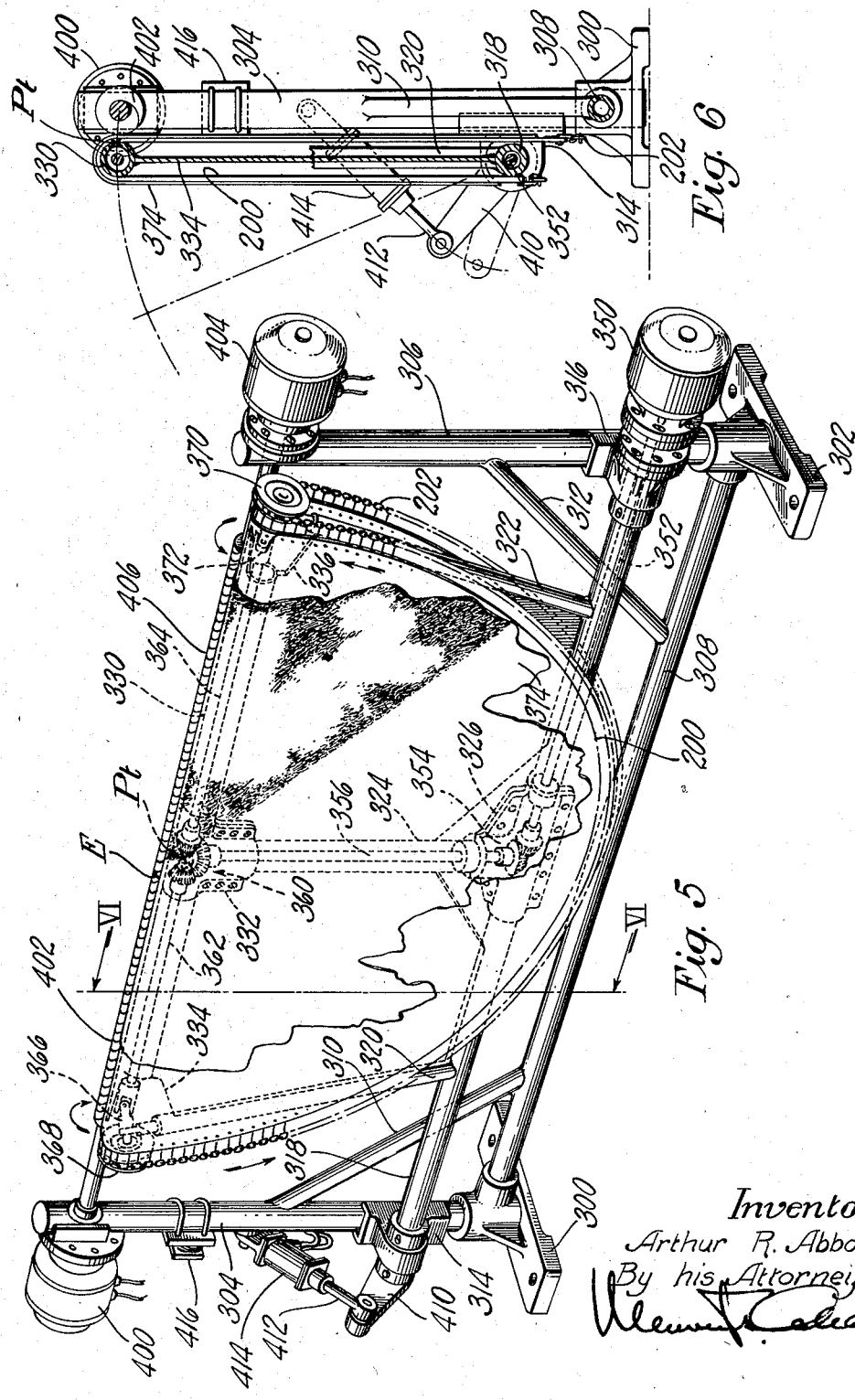

2,553,537

UNITED STATES PATENT OFFICE 2,553,537

ROTATABLE APRON MACHINE FOR TREATING HIDES AND SIMILAR PIECES OF WORK

Arthur R. Abbott, Beverly, Mass., assignor to United Shoe Machinery Corporation, Flemington, N. J., a corporation of New Jersey Application August 19, 1949, Serial No. 111,276

18 Claims. (Cl. 69—37)

1

This invention relates to machines for treating hides, skins, leather and other similar pieces of work. While the invention is illustrated with reference to a machine for removing hair from hides, it is to be understood that the invention has other applications and uses, such, for instance, as fleshing, brushing, putting out, and polishing.

Hides and skins are highly irregular in contour and they are also baggy, coming, as they do, from the barrel-like forms of animals. Many operations are performed on such work pieces and the nature of each piece is such that considerable manipulation is necessary during the treatments given by the various tannery machines. Feed rolls tend to mat the hair and sometimes crease the hide prior to unhairing in the conventional unhairing machine and end-to-end reversal of each work piece during that and other machine operations is usual in order to retain control of the work passage during its treatment and to insure full treatment over each entire work piece area. The use of a flat horizontal table or surface for supporting a work piece for treatment by appropriate tools is common but the bagginess and other characteristics of the work give rise to difficulties in applying uniform treatment and in feeding the work through the machine without folding, wrinkling or creasing it.

An object of the present invention is to provide an improved machine which will permit an operation to be performed on the full area of a work piece during one revolution of the latter. Another object is to provide a machine in which the floor area required is at a minimum and in which the work support and treating tool means cooperate to smooth out the work without the use of feeding or discharging rolls or other work tensioning devices being necessary.

It is an important feature of the invention that a flexible apron is mounted in draped position over an elongated horizontal member and arranged to be rotated for treatment of a work piece supported on the apron. Another feature is a flexible work-supporting rotatable apron in combination with work treating tool means, one being movable relative to the other to place the parts in operative or inoperative position. Still another feature is a circular apron of flexible sheet material having a driving chain attached along its periphery for rotating it upon a suitable support.

The above and other features of the invention, including various novel details of construction, will now be more particularly described by reference to the accompanying drawings and pointed out in the claims.

In the drawings,

Fig. 1 is a view in front elevation of one form of the machine in which the invention is embodied, portions of the machine being cut away for ease of illustration;

Fig. 2 is a side view of the machine shown in Fig. 1, the motor being omitted;

Fig. 3 is a sectional view taken along the line III—III of Fig. 1;

Fig. 4 is a sectional view taken along the line IV—IV of Fig. 1 and drawn to a larger scale;

Fig. 5 is a perspective view of a modified form of machine embodying the principles of the invention; and Fig. 6 is a sectional view along the line VI—VI of Fig. 5.

The machine of Figs. 1 to 4 inclusive comprises a frame which includes a horizontal box-like member 10 which serves as a base and two diverging tubular members 12 and 14 which are welded and rigidly affixed to the top wall of the box-like member 10. The frame also includes a substantially horizontal and elongated top member 16 which is firmly welded at each end to the top end of one of the tubular members 12 or 14. The elongated member 16 is substantially cylindrical in cross section at its ends and is somewhat pear-shaped at its center as may be seen in Fig. 4. The top surface of the member 16 has a transverse, convex curvature.

Beneath and centrally of the elongated member 16 a boss 18 is provided to which a bearing block 20 is attached by means of bolts 22 and 24 (Fig. 1). The block 20 is provided with two bearings 26 and 28 in which upper stub shafts of conical members 30 and 32 are journaled. These conical members may be made of wood or some similar lightweight material of suitable strength and they are provided with end plates 34 and 36 through which the conical members are driven.

A boss 40 (Fig. 1) is located on the interior side of the top wall of the box-like base 10 and a boss 42 is located on the top side of the bottom plate of the box-like member 10. These bosses are concentric and serve as journals for a vertical shaft 44 to which is keyed a gear 46 and a pulley 48. A thrust bearing 50 is placed between the boss 42 and the pulley 48. A hub 52 is formed integral with the top wall of the base 10 and is concentric with the axis of the conical member 32 to serve as a journal for a shaft 54 which is adapted to drive the plate 36 and the conical member 32. A pocket wheel 56 is keyed to the shaft 54 just above the boss 52. Inside of the box-like base 10 gears 58 and 60 (with a common hub 62) are keyed to the shaft 54 and the gear 58 is in engagement with the gear 46. Coaxial with the conical member 30 is a driving shaft 70 which is journaled in a hub 72 integral with the top plate of the base 10. A collar 74 is pinned to the shaft 70 and bears downwardly on the hub 72. The bottom end of the shaft 70 has keyed thereto two gears 80 and 82 having a common hub 84 and the gear 80 is in engagement with the gear 46.

A motor 90 is mounted on one end of the base member 10 and is arranged to drive a pulley 92 and a belt 94 the latter running over the two pulleys 92 and 48.

Beneath the lower end of each of the diverging tubular members 12 and 14 is located a hub 98 or 100. Each of these hubs is inclined slightly to the vertical (parallel to the axis of the adjacent conical member 30 or 32) and supports a non-rotatable sleeve 102 or 104. The sleeve 104 serves as a journal for a shaft 106 and the upper end of the shaft 106 bears a bevel gear 108 pinned to it. The bevel gear 108 has a common hub 110 with a spur gear 112 (the latter engaging the gear 60) and a cylindrical plate 114. The plate 114 has a short pin 116 projecting downwardly and arranged to engage slots 118 (Fig. 3) of a Geneva wheel 120 the latter being adapted to rotate on a shaft 122 supported from the under side of the upper wall of the base member 10. Near the periphery of the Geneva wheel 120 is a wedge-like projection 124 which, at the proper time, is adapted to contact and raise the lever 126 of an electrical switch 128. This stop switch 128 is placed in the circuit of the motor 90.

The non-rotatable sleeve 102 (Fig. 1) serves as a journal for a shaft 129 of a bevel gear 130 and a spur gear 132 which are adapted to be driven together as the teeth of the gear 132 are in mesh with the teeth of the gear 82.

The tubular members 12 and 14 are equipped with power transmission details which are similar. Therefore only one will be specifically described. The tubular member 14 is provided internally with two bearing blocks 140 and 142 in which is journaled a shaft 144 the lower end of which is pinned to a bevel gear 146 which is in engagement with the bevel gear 108. The upper end of the shaft 144 has keyed thereto a bevel gear 148. The upper end of the tubular member 14 is provided with a boss 150 to which a bracket 152 is attached by means of bolts 154. The upper end of the bracket 152 serves as a bearing for the shaft 156 which is keyed to a bevel gear 158 and pocket wheel 160. The bevel gear 158 is in engagement with the bevel gear 148.

A flexible and rubberized apron 200 and without protrusions, circular in form, is draped over the elongated member 16 and linked along the periphery of the apron is a chain 202. The apron is imperforate except for the attachment of the chain. The links of the chain 202 are proportioned and arranged to drop into the pockets of the two pocket wheels 160 (only one shown) and the single pocket wheel 56. A bracket 204 (Fig. 1) is bolted at 206 to the upper end of the tubular member 14. This bracket is so placed as to restrain the links of the chain 202 from leaving the pockets of the wheel 160. The apron 200 is draped over the elongated top member 16 so that its center is at point P (Figs. 1 and 4) which is below the convex surface of the member 16.

A treadle 210 (Fig. 2) is pivoted to the base 10 and is arranged to trip a switch 212. This switch 212 is in the circuit for the motor 90 and the arrangement is such that initial depression of the treadle will close the circuit and the circuit will remain closed (because of the operation of a suitable relay) until it is opened by the switch 128. The specific circuits chosen are not illustrated as no invention resides therein, and the circuits may be selected to suit specific requirements. After an initial depression of the treadle 210 a spring 214 is provided to return the lever 210 to its original position.

At one side of the base 10 suitable projections 220 (one shown in Fig. 2) are provided and these serve as journals for a shaft 222 upon which is pivoted a bracket 224 the latter serving as a journal for a shaft 226. The shaft 226 is integral with an unhairing tool 228 which is provided with spiral blades and is tapered in form. The arrangement is such that the planes of action of the tool 228 are parallel with the surfaces of the conical members 30 and 32 when the tool 228 is swung to the position as indicated in Figs. 3 and 4. The shaft 226 is provided with a pulley 230 and is adapted to be driven by a belt 232 from a source of power not shown.

A link 240 (Fig. 2) is pivoted to the bracket 224 and suitable mechanism (not shown) is provided for operating the link 240 to swing the tool 228 with respect to the axis of the shaft 222 toward or away from its operative position.

A hide 242 is partially shown in Fig. 1 to illustrate its position upon the apron 200 when being subjected to treatment by the tool 228.

With the construction as illustrated in Figs. 1 to 4 inclusive and assuming that the operation to be performed is an unhairing operation the operator separates the tool 228 from the apron 200 by causing the link 240 to swing the tool 228 so that the axis of the latter assumes the position shown by the line Y of Fig. 2. The operator then drapes the hide 242 over the elongated member 16 and the apron 200. It is of course to be understood that the apron 200 is of such size as to exceed in area that of any work piece to be treated. The operator then steps on the treadle 210 momentarily with the result that the motor 90 operates and the apron 200 rotates with its center of rotation approximately at the point P (Figs. 1 and 4). It is assumed that the tool 228 is being constantly rotated by the belt 232, and when the work piece 242 is in its draped position the link 240 is caused to swing the tool 228 into its position as shown in Figs. 3 and 4. The momentary depression of the treadle 210 brings about the initiation of the rotation of the apron 200 and the work piece 242. It will be noted that the length of the tool 228 is such that it extends upwardly and beyond the point P, the center of rotation. As the apron and the work piece are rotated about the point P and while in the draped position, the tool 228 is rotated in such a direction about its own axis that the scraping action of the blades on the work piece is in the direction of the arrow A as shown in Fig. 4—i. e., radial from the center of rotation of the apron. As the hide 242 continues to rotate different successive portions thereof are treated as they are backed up by the apron 200 and by the conical walls of the members 30 and 32, and when slightly more than a complete revolution of the hide has taken place the action of the gearing in the base 10 and the Geneva wheel 120 will be such as to trip the switch 128 and automatically stop the machine. Breaking of the circuit may be made automatically to return the tool 228 to its inoperative position (Y) although such automatic operation is not essential. The machine is then ready for the introduction of the next work piece.

In the second modification of the machine (Figs. 5 and 6) a vertical frame construction of tubular members is utilized. It is composed of two cast base members 300 and 302 to which are affixed vertical stanchions 304 and 306. A horizontal tubular member 308 is utilized to connect the two base members 300 and 302 and it is joined to the vertical stanchions 304 and 306 by stiffening members 310 and 312. These parts are all welded together to form a unitary structure.

A bracket 314 is affixed to the bottom part of the stanchion 304 and a bracket 316 is fastened to the bottom half of the stanchion 306. These two brackets serve as journals for a tubular member 318 which also forms a part of the machine frame. Tubular members 320, 322 and 324 are rigidly fastened to the tubular member 318. The tubular members 320 and 322 are welded to the tubular member 318 whereas the member 324 is rigidly affixed to a gear case 326 bolted (in halves) to the central portion of the tubular member 318.

A substantially horizontal elongated member 330 in the form of a tube is supported on the upper ends of the tubular members 320, 322 and 324. The connection between the member 324 and the member 330 is by way of a gear case 332 bolted thereto and by plates 334 and 336. Plate 334 is welded to each of the tubular members 320, 330, 324 and 318 whereas plate 336 is welded to the members 322, 330, 324 and 318.

A motor 350 is mounted at one end of the machine frame and is arranged to drive a shaft 352 passing along the center of the tubular member 318 and bevel gears 354 are arranged within the gear box 326 to drive a shaft 356 within the tubular member 324. A set 360 of three bevel gears is mounted within the gear box 332 and is adapted to be driven by the shaft 356 and they in turn drive two shafts 362 and 364 in opposite directions. The shaft 362 is provided with a universal joint connection 366 to a pocket wheel 368. The shaft 364 drives the pocket wheel 370 through a universal joint connection 372.

A circular apron 200 similar to that of Fig. 1 and with a chain 202 fixed to its periphery is draped over the elongated tubular member 330 and is adapted to support a work piece 374. The apron is so placed that its center is at point Pt (Figs. 5 and 6) with relation to the member 330.

The top of the stanchion 304 is provided with a motor 400 which is arranged to drive a helical, bladed tool 402 in the direction as indicated by the arrow (Fig. 5). The tool 402 terminates at point E (Fig. 5) which is a short distance from the midway point between the pocket wheels 368 and 370.

The top of the stanchion 306 carries a motor 404 which is adapted to drive a tool 406. This tool 406 is similar to the tool 402 but is adapted to be driven in the opposite direction, as indicated by the arrow. The tool 406 terminates adjacent to the end of the tool 402 (point E).

One end of the horizontal tubular member 318 is provided with an arm 410 keyed to it and to the end of this arm is pivoted the operative link 412 of a hydraulic motor 414 affixed to the stanchion 304. A switch 416 controlling the desired circuits is mounted on the stanchion 304.

The operation of the machine shown in Fig. 5 is similar to that of the machine shown in Fig. 1 but no conical or additional backing-up members are required as the substantially horizontal and elongated member 330 serves not only as a supporting device for the apron and the work piece but also as a backing-up member to facilitate operation of the tools 402 and 406.

In the machine of Fig. 1 the tool 228 is moved into or away from operative position whereas in the machine of Fig. 5 the tools 402 and 406 remain stationary and the apron, as well as the work piece, is moved into and out of operative relation to the tools 402 and 406 by means of the hydraulic motor 414. In each machine the elongated member 16 (Fig. 1) or 330 (Fig. 5) may be made up of rotatable members or segmental rolls but such devices are not essential as the friction engendered by the non-rotatable members disclosed has been found to be inconsequential.

In actual operation of either machine, the co-operation of the tools and apron is such that the flanks and irregular portions of each hide or skin are flattened out while under treatment and the operator need not unduly concern himself with the manner in which he drapes each work piece.

Either machine as disclosed may be used as a work supporting and feeding device without a work treating tool being attached thereto. A hand tool such as a spraying device may be used to treat the work as the apron revolves.

Having described my invention, what I claim as new and desire to secure by Letters Patent of the United States, is:

1. In a machine for operating upon hides, skins, leather and other similar pieces of work, a frame including an elongated and substantially horizontal member, said member having a top surface with a transverse convex curvature, a circular apron over said surface, and means for rotating said apron while it is bodily maintained in position.

2. In a machine for operating upon hides, skins, leather and other similar pieces of work, a frame including an elongated and substantially horizontal member, an apron draped over and suspended from both sides of said member, and means for rotating said apron while in its draped position.

3. In a machine for operating upon hides, skins, leather and other similar pieces of work, a frame including an elongated member, an apron draped over said member, and means for rotating said apron in its draped position.

4. In a machine for operating upon hides, skins, leather and other similar pieces of work, a frame including an elongated member, an apron draped over said member, a chain attached to the periphery of said apron, and means for driving said chain to rotate said apron in its draped position.

5. In a machine for operating upon hides, skins, leather and other similar pieces of work, a frame including an elongated member, an apron draped over said member, a work treating tool arranged to treat work placed on said apron, and means for rotating said apron in its draped position.

6. In a machine for operating upon hides, skins, leather and other similar pieces of work, a frame including an elongated member, an apron draped over said member, a tool arranged to treat work supported on said apron, said apron and tool being relatively movable, and means for rotating said apron in its draped position.

7. In a machine for operating upon hides, skins, leather and other similar pieces of work, a frame including an elongated member, an apron draped over said member, rotatable cones arranged to back up one suspended side of said apron, a tool cooperating with said cones to treat work supported on said apron, said apron and tool being relatively movable, and means for rotating said apron in its draped position.

8. In a machine for operating upon hides, skins, leather and other similar pieces of work, a frame including an elongated and substantially horizontal member having a top surface with a transverse convex curvature, a circular apron draped over said surface, means for backing up one suspended side of said apron, a tool arranged to cooperate with said backing up means to treat a work piece supported on said apron, said tool and apron being relatively movable, and means for rotating said apron while in its draped position.

9. In a machine for operating upon hides, skins, leather and other similar pieces of work, a frame including an elongated member, and apron draped over said member, a tool arranged to treat a work piece supported on said apron, means for moving said apron toward and away from said tool, and means for rotating said apron in its draped position.

10. In a machine for operating upon hides, skins, leather and other similar pieces of work, a frame including an elongated and substantially horizontal member, an apron draped over said member, tool means for treating the work piece supported on said apron, said apron being bodily movable toward and away from said tool means, and means for rotating said apron in a draped position.

11. In a machine for operating upon hides, skins, leather and other similar pieces of work, a frame including an elongated and substantially horizontal member having a top surface with a transverse convex curvature, a circular apron draped over said surface, tool means arranged to treat a work piece supported on said apron, means for bodily moving said apron toward and away from said tool means, and means for rotating said apron while in its draped position.

12. In a machine for operating upon hides, skins, leather and other similar pieces of work, a stationary frame including an elongated and substantially horizontal member, said member having a top surface with a transverse convex curvature, a circular apron draped over said surface, a chain attached to the periphery of said apron, conical means for backing up one suspended side of said apron, a tool with a helical blade arranged to cooperate with said conical means to treat a work piece supported on said apron, said tool being movable toward and away from said apron, and means for driving said chain to rotate the said apron while the latter is in its draped position.

13. In a machine for operating upon hides, skins, leather and other similar pieces of work, a frame including an elongated and substantially horizontal member having a top surface with a transverse convex curvature, the circular apron being draped over said surface, said frame also supporting stationary tool means arranged to cooperate with said top surface to treat a work piece supported on said apron, means for moving said top surface and apron toward and away from said tool means, a chain attached to the periphery of said apron, and means for driving said chain to rotate the said apron while in its draped position.

14. In a machine for operating upon hides, skins, leather and other similar pieces of work, a rotatable and circular apron of flexible material, the central portion of said apron being imperforate and free of protrusions, and means for contacting and driving the periphery of said apron.

15. In a machine for operating upon hides, skins, leather and other similar pieces of work, a frame, an apron supported on said frame, means for rotating said apron about a selected point on said frame, and a tool arranged to treat different successive portions of a work piece placed on said apron, the effective line of action of said tool extending radially from the center of rotation of the apron.

16. In a machine for operating upon hides, skins, leather and other similar pieces of work, a frame including an elongated horizontal member, an apron of flexible material draped over said member, the central portion of said apron being imperforate and free of protrusions, a tool arranged to treat a work piece supported on said apron, the path of effective action of said tool being outwardly and parallel with the surface of said central portion, and means for rotating the work piece and apron while the latter is in its draped position.

17. In a machine for operating upon hides, skins, leather and other similar pieces of work, a frame with an elongated transversely convex surface, a flexible apron with no protrusions on its surface, said apron being draped over and depending from each side of said surface, and means for rotating the draped apron about a center which is below the said convex surface.

18. In a machine for operating upon hides, skins, leather and other similar work pieces, a rotatable and circular apron of flexible material for supporting a work piece, and means for supporting said apron and for rotating it so as to move different portions of said work piece successively into and out of a plane substantially normal to the axis of rotation of said apron.

ARTHUR R. ABBOTT.

REFERENCES CITED

The following references are of record in the file of this patent:

UNITED STATES PATENTS

| Number | Name | Date |
|---|---|---|
| 1,207,065 | Miller | Dec. 5, 1916 |
| 1,823,483 | Bausman | Sept. 15, 1931 |